United States Patent
Onodera et al.

(10) Patent No.: US 11,253,954 B2
(45) Date of Patent: Feb. 22, 2022

(54) METHOD FOR MEASURING INCLINATION OF WATERJET OF LASER MACHINING DEVICE

(71) Applicant: MAKINO MILLING MACHINE CO., LTD., Tokyo (JP)

(72) Inventors: Hisashi Onodera, Aiko-gun (JP); Nobuaki Igi, Aiko-gun (JP); Hiroshi Toyama, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 274 days.

(21) Appl. No.: 15/763,597

(22) PCT Filed: Sep. 30, 2015

(86) PCT No.: PCT/JP2015/077806
§ 371 (c)(1),
(2) Date: Mar. 27, 2018

(87) PCT Pub. No.: WO2017/056257
PCT Pub. Date: Apr. 6, 2017

(65) Prior Publication Data
US 2018/0281109 A1     Oct. 4, 2018

(51) Int. Cl.
*B23K 26/14* (2014.01)
*B23K 26/06* (2014.01)
(Continued)

(52) U.S. Cl.
CPC ........ *B23K 26/1438* (2015.10); *B23K 26/064* (2015.10); *B23K 26/0643* (2013.01); *B23K 26/146* (2015.10); *B23K 26/705* (2015.10)

(58) Field of Classification Search
CPC .............. B23K 26/1438; B23K 26/064; B23K 26/146; B23K 26/705; B23K 26/0643
(Continued)

(56) References Cited

U.S. PATENT DOCUMENTS 5,902,499 A * 5/1999 Richerzhagen .... B23K 26/0648
219/121.84
8,134,098 B2 * 3/2012 Muratsubaki ........ B23K 26/146
219/121.67
(Continued)

FOREIGN PATENT DOCUMENTS

JP        2-72000      3/1990
JP     2006-255769     9/2006
(Continued)

OTHER PUBLICATIONS

International Search Report dated Dec. 22, 2015; directed to PCT Application No. PCT/JP2015/077806; 2 pages.

*Primary Examiner* — Jimmy Chou
(74) *Attorney, Agent, or Firm* — Morrison & Foerster LLP

(57) ABSTRACT

The purpose of the present invention is to provide a method for measuring the inclination of a waterjet relative to a machine coordinate system of a laser machining device. The present invention provides a method for measuring the inclination of a waterjet of a laser machining device in which a laser beam that has been introduced and guided into a waterjet jetted from an optical head is moved relative to a workpiece fixed to a table so as to machine the workpiece, wherein measured is the inclination of the waterjet relative to the table which is within a stable-length range in which the laser beam passing through the inside of the waterjet can be reflected so as to advance in the axial direction.

3 Claims, 9 Drawing Sheets

(51) Int. Cl.
  *B23K 26/064* (2014.01)
  *B23K 26/146* (2014.01)
  *B23K 26/70* (2014.01)

(58) Field of Classification Search
  USPC .................................. 219/121.84; 73/1.75
  See application file for complete search history.

(56) References Cited

U.S. PATENT DOCUMENTS

| | | | |
|---|---|---|---|
| 8,859,988 B1* | 10/2014 | Gaebelein | B23K 26/146 250/432 R |
| 2007/0262063 A1* | 11/2007 | Sano | B23K 26/067 219/121.85 |
| 2007/0278195 A1* | 12/2007 | Richerzhagen | B23K 26/0665 219/121.69 |
| 2009/0045177 A1* | 2/2009 | Koseki | B23K 26/0643 219/121.67 |
| 2009/0084235 A1* | 4/2009 | Kata | G05B 19/404 83/72 |
| 2009/0084765 A1* | 4/2009 | Muratsubaki | B23K 26/146 219/121.67 |
| 2010/0108648 A1* | 5/2010 | Koseki | B26F 3/004 219/121.67 |
| 2013/0206739 A1* | 8/2013 | Reed | B23K 26/389 219/121.71 |
| 2013/0298387 A1* | 11/2013 | Kobier | H01M 10/04 29/623.1 |
| 2015/0165553 A1* | 6/2015 | Gaebelein | B29D 30/0606 219/121.84 |
| 2015/0165559 A1* | 6/2015 | Gaebelein | B23K 26/1462 219/121.67 |
| 2017/0072511 A1* | 3/2017 | DiGiovanni | B24D 99/005 |
| 2017/0157709 A1* | 6/2017 | Richerzhagen | B23K 26/035 |
| 2017/0232558 A1* | 8/2017 | Kano | B23K 26/0861 219/121.72 |

FOREIGN PATENT DOCUMENTS

| | | |
|---|---|---|
| JP | 2008-519691 | 6/2008 |
| JP | 2009-83022 | 4/2009 |
| JP | 2011-235347 | 11/2011 |
| JP | 2013-239439 | 11/2013 |
| JP | 2015-140805 | 8/2015 |

* cited by examiner

FIG. 3
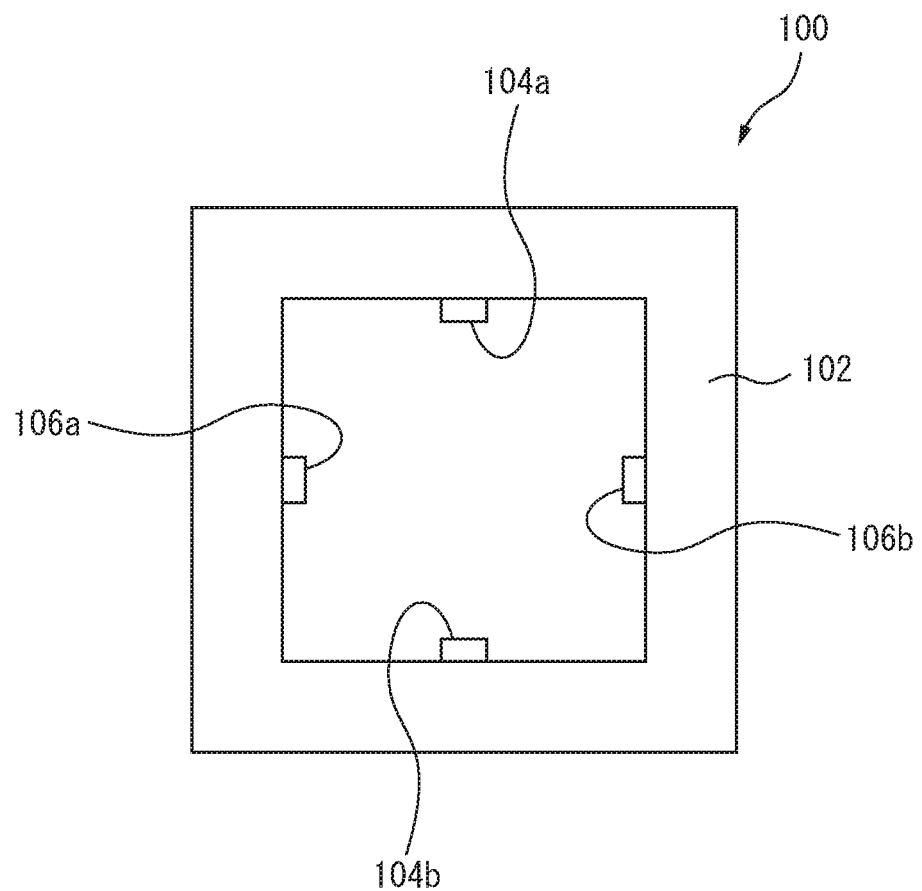
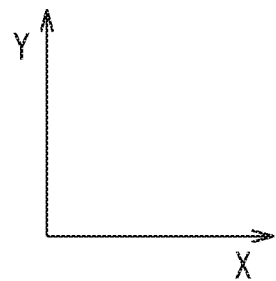

METHOD FOR MEASURING INCLINATION OF WATERJET OF LASER MACHINING DEVICE

CROSS-REFERENCE TO RELATED APPLICATION

This application is a U.S. National phase patent application of International Patent Application No. PCT/JP2015/077806, filed Sep. 30, 2015, the contents of which is hereby incorporated by reference in the present disclosure in its entirety.

FIELD OF THE INVENTION

The present invention relates to a method for measuring the inclination of the water jet of a laser machining device which machines a workpiece using laser light passing through a water jet formed by jetting water from a nozzle, wherein the inclination of the water jet is measured with respect to the machine coordinate system of the laser machining device.

BACKGROUND OF THE INVENTION

Patent Literature 1 discloses a laser machining device for machining a workpiece using laser light passing through a water jet formed by jetting water from a nozzle, which comprises an alignment adjusting device that aligns the optical axis of laser light with the central axis of a water jet.

PATENT LITERATURES

Patent Literature 1: JP-A-2011-235347

BRIEF SUMMARY OF THE INVENTION

According to the invention of Patent Literature 1, though the optical axis of the laser light can be aligned with the central axis of the water jet, the water jet jetted from the nozzle may be inclined with respect to the machine coordinate system of the laser machining device, in particular the Z-axis, due to a manufacturing error or mounting error of the nozzle. If the water jet is inclined, even if the optical axis is adjusted with respect to the water jet, machining precision will be reduced.

The technical object of the present invention is to solve such problem of the prior art, and the present invention aims to provide a method for measuring the inclination of the water jet with respect to the machine coordinate system of the laser machining device.

In order to achieve the above object, according to the present invention, provided is a method for measuring inclination of a water jet of a laser machining device which machines a workpiece, by relatively laser light which has been introduced and guided into the interior of a water jet jetted from an optical head and a workpiece which is fixed to a table, the method comprising: measuring the inclination of the water jet with respect to the table within a stable-length range in which the laser light passing through the interior of the water jet can be reflected and advance in the axial direction.

According to the present invention, since the inclination of the water jet is measured in a stable-length range, the inclination of the water jet can be accurately measured, and it is possible to adjust the inclination of the water jet by adjusting the movement amount of the X-, Y-, and Z-linear feed axes of the laser machining device, and adjusting the A-, B-, and C-rotary feed axes as necessary, based on the inclination of the water jet. As a result, it is possible to irradiate the laser light generated by the optical head perpendicularly to the surface of the workpiece, thereby improving machining accuracy. Further, the inclination of the water jet can be adjusted to arbitrary angles with respect to the surface of the workpiece.

BRIEF DESCRIPTION OF THE DRAWINGS

FIG. 3 is a plan view of the measurement device of FIG. 2.

DETAILED DESCRIPTION OF THE INVENTION

Figure 1:
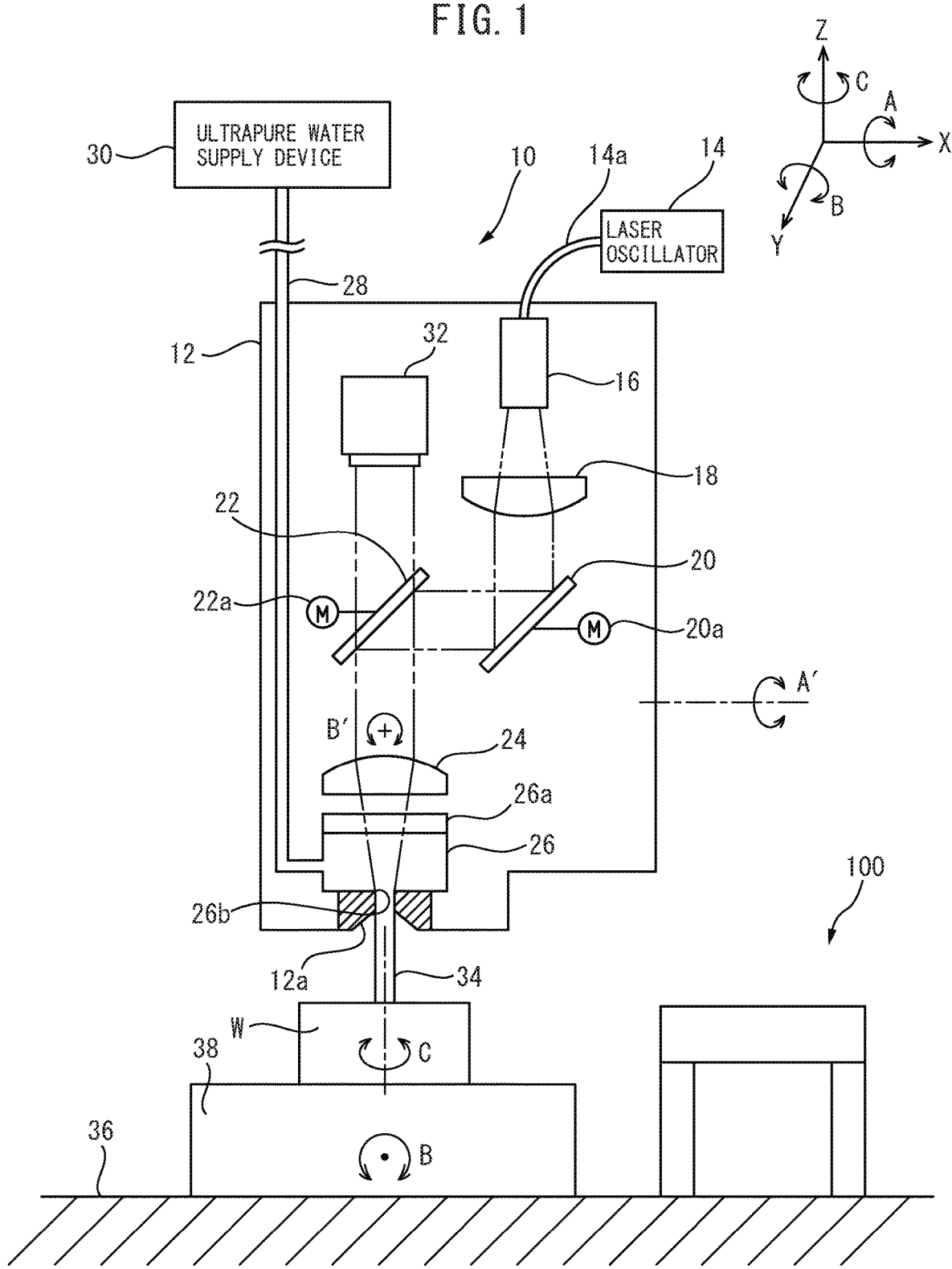
FIG. 1 is a schematic cross-sectional view showing an example of an optical head of a laser machining device to which the method for measuring the inclination of a water jet of the present invention is applied.
Figure 2:
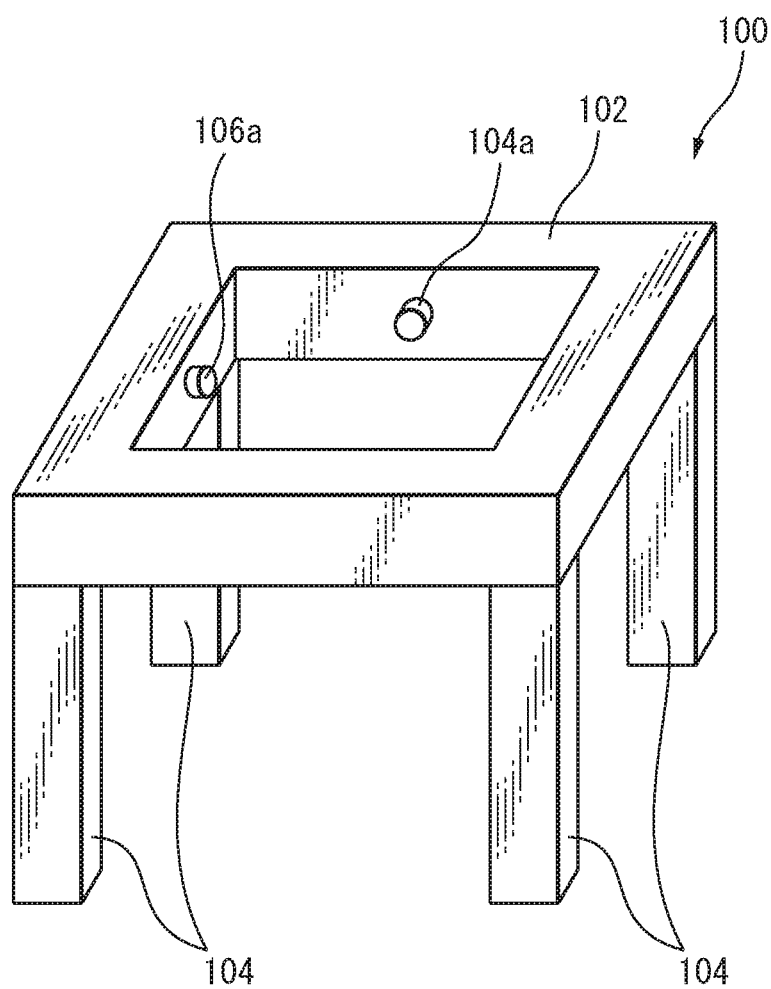
FIG. 2 is a perspective view showing an example of a measurement device.

FIG. 1 shows an optical head of a laser machining device as an example of a machine tool to which the present invention can be applied. In FIG. 1, the laser machining device includes an optical head 10 and a table 36 arranged below the optical head 10. The optical head 10 and the table 36 can be moved relative to each other in three orthogonal directions by X-, Y-, and Z-linear feed axis devices (not shown). In the present embodiment, the optical head 10 can be moved vertically by a Z-axis feed device as a first feed axis. The table 36 can be moved in the left and right directions (the left and right directions in FIG. 1) and the forwards and backwards directions (the directions perpendicular to the sheet of the drawing in FIG. 1) by an X-axis feed device and a Y-axis feed device as second and third feed axes, respectively. Furthermore, each of these linear feed axis devices is controlled by a controller (not shown) of the laser machining device. In order to read the coordinates of each linear feed axis device, the control device is also connected to a coordinate reading device such as a linear scale (not shown) provided on each feed axis and a rotary encoder (not shown) of a servo motor for driving each feed axis device.

The optical head 10 is provided in a housing 12, and includes a laser irradiation head 16 for receiving laser light from a laser oscillator 14 through a light guide member 14a, such as an optical fiber, and irradiating the laser light toward a collimation lens 18. The laser light from the laser irradiation head 16 is collimated by the collimation lens 18, is reflected by a first mirror 20 toward a second mirror 22, and is reflected by the second mirror 22 toward a focus lens 24. The laser light focused by the focus lens 24 is irradiated in the Z-axis direction to the outside of the housing 12 through the nozzle head 26.

The first and second mirrors 20, 22 have planar reflecting surfaces, and include, as mirror orientation adjusting means, motors 20a, 22a for adjusting the directions of the reflecting surfaces (the direction perpendicular to the reflecting surfaces) whereby the direction of the laser light emitted from the optical head 10 can be adjusted. Furthermore, the first and second mirrors 20, 22, in particular the second mirror 22 so as to reflect the laser light toward the focus lens 24, has a dielectric multilayer film which is adapted to the wavelength of the laser light emitted from the laser oscillator 14 which reflects the laser light and allows light having a wavelength other than the wavelength of the laser light to pass therethrough. More specifically, such a dielectric multilayer film is formed by vapor deposition on a glass plate. By forming the second mirror 22 from a dielectric multilayer film, it is possible to monitor the positional relationship between the nozzle 26b and the laser light passing through the nozzle 26b using a camera 32.

The table 36 is disposed facing the optical head 10. A rotary table 38 is attached to the upper surface of the table 36, and the workpiece W is attached to the rotary table 38. The rotary table 38 is capable of rotating and moving the workpiece W in at least one rotary feed axis direction. In the embodiment of FIG. 1, the rotary table 38, which is illustrated in a simple manner, can rotationally feed the workpiece W in the B-axis direction around an axis parallel to the Y-axis (perpendicular to the sheet of the drawing in FIG. 1) and the C-axis direction around an axis parallel to the Z-axis (in the vertical direction in FIG. 1).

The nozzle head 26 is a hollow member which receives a supply of ultrapure water from an ultrapure water supply device 30 via a duct 28. The ultrapure water supply device 30 generates ultrapure water by means of, for example, a reverse osmosis membrane device (not shown), an ultraviolet sterilizer (not shown), an ion exchange resin (not shown), or the like by pressurizing city water or tap water previously filtered by a filter, such as an activated carbon filter (not shown), with a pump (not shown). Ultrapure water generated in this way is stored in a tank (not shown) disposed in the ultrapure water supply device 30, and is then supplied by the pump to the nozzle 26b of the optical head 10 via the duct 28.

A nozzle 26b for jetting a water jet 34 is provided on the bottom wall of the nozzle head 26 facing the table 36, and a window 26a made of a transparent member, such as glass, is provided on the upper surface of the nozzle head facing the focus lens 24 on the side opposite the bottom wall. The nozzle 26b is communicable with the outside of the housing 12 through an aperture 12a formed in the bottom of the housing 12 of the optical head 10.

Figure 9:
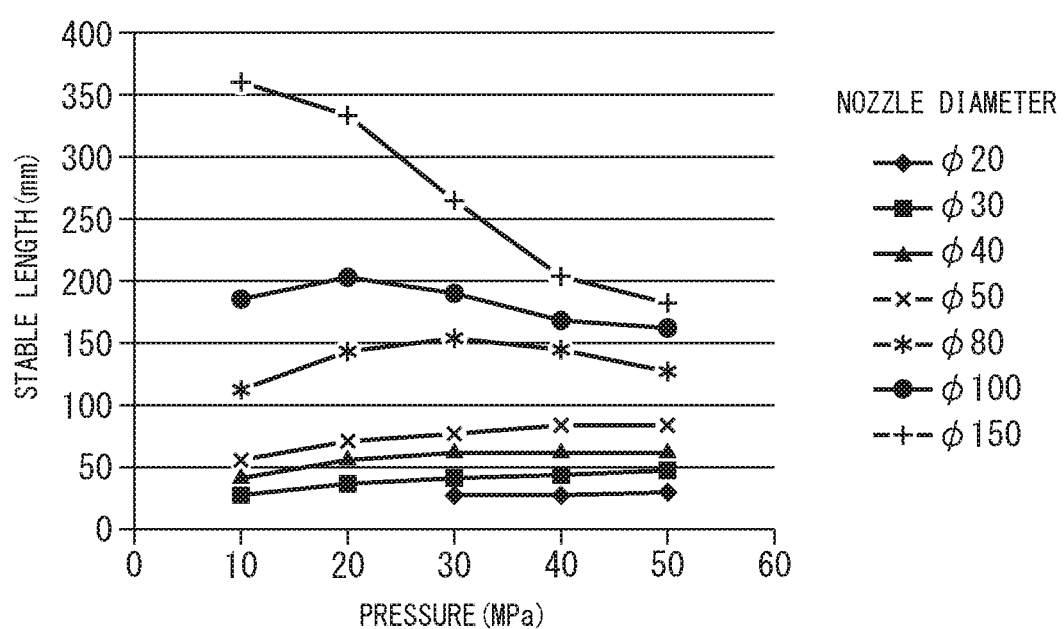
FIG. 9 is a graph showing the change in stable-length of a water jet with respect to the pressure of the ultrapure water supplied to the nozzle jetting the water jet.

The laser light from the laser irradiation head 16 reaches the nozzle head 26 via the focus lens 24 through the collimation lens 18, the first mirror 20, the second mirror 22, and enters the water jet 34 jetted from the nozzle 26b. The incident laser light is guided by the water jet while being totally reflected within the water jet 34, and is irradiated to the outside of the optical head 10. In order for the laser light introduced into the water jet 34 to repeatedly totally reflect at the interface with the surrounding air of the water jet 34, the flow of the water jet 34 must be stable. The jet of water is a laminar flow immediately after having been jetted from the nozzle 26b. As the Reynolds number increases in the direction of flow, the jet of water gradually changes to a turbulent flow and gradually causes a vortex and splashing, and the diameter of the water jet 34 increases in a divergent manner. In a region where water jet 34 is vortexed or splashes are scattered from the surface of the water jet 34, a part of the laser light introduced into the water jet 34 leaks from the surface of the water jet 34 to the outside without being totally reflected. In the present application, the length of the water jet 34 in which substantially all of the laser light introduced into the water jet 34 can be totally reflected within the water jet 34 is referred to as a stable-length. The stable-length varies depending on the diameter and shape of the nozzle 26b, the speed of water jet jetted from the nozzle 26b, the pressure of ultrapure water supplied to the nozzle 26b, etc. Table 1 shows the change in the stable-length (mm) with the diameter (μm) of the nozzle 26b and the pressure (MPa) of the ultrapure water supplied to the nozzle 26b as parameters. The example of Table 1 is shown in the graph of FIG. 9.

TABLE 1

| Pressure | Nozzle Diameter (μm) | | | | | | |
|---|---|---|---|---|---|---|---|
| (MPa) | φ20 | φ30 | φ40 | φ50 | φ80 | φ100 | φ150 |
| 10 | — | 28 mm | 43 mm | 56 mm | 113 mm | 186 mm | 360 mm |
| 20 | — | 36 mm | 56 mm | 71 mm | 143 mm | 204 mm | 334 mm |
| 30 | 26 mm | 41 mm | 61 mm | 78 mm | 154 mm | 191 mm | 265 mm |
| 40 | 26 mm | 44 mm | 61 mm | 84 mm | 145 mm | 169 mm | 204 mm |
| 50 | 28 mm | 47 mm | 61 mm | 84 mm | 128 mm | 163 mm | 182 mm |

The table 36 is also equipped with a water jet inclination measuring device 100. In the present embodiment, the inclination measuring device 100 includes a rectangular frame 102, legs 104 extending downward from the frame 102, and a non-contact type sensor attached to the inner surface of the frame 102. In the present embodiment, the non-contact sensor includes first laser sensors 104a, 104b which emit laser light in the Y-axis direction and second laser sensors 106a, 106b which emit laser light in the X-axis direction. For example, photoelectric sensors which are commercially available from Omron Corporation under the trade name Fiber Sensor can be used as the first laser sensors 104a, 104b and the second laser sensors 106a, 106b. Each of the first and second laser sensors includes light-emitting parts 104a, 106a, and light receiving parts 104b, 106b. Laser light is guided from an amplifier (not shown) that generates the laser light to the light-emitting parts 104a, 106a via optical fibers (not shown), and the laser light received by the light receiving parts 104b, 106b is guided to the amplifier via the optical fiber (not shown). When the laser light irradiated from the light-emitting parts 104a, 106a to the light receiving parts 104b, 106b is blocked, a skip signal is sent from the amplifier to the control device of the laser machining device. For the sensor of the inclination measuring device 100, not only a laser sensor but also an ultrasonic sensor may be used. Further, instead of the laser sensor, an image captured by a camera may be analyzed.

The mode of operation of the present embodiment will be explained below.

Figure 4:
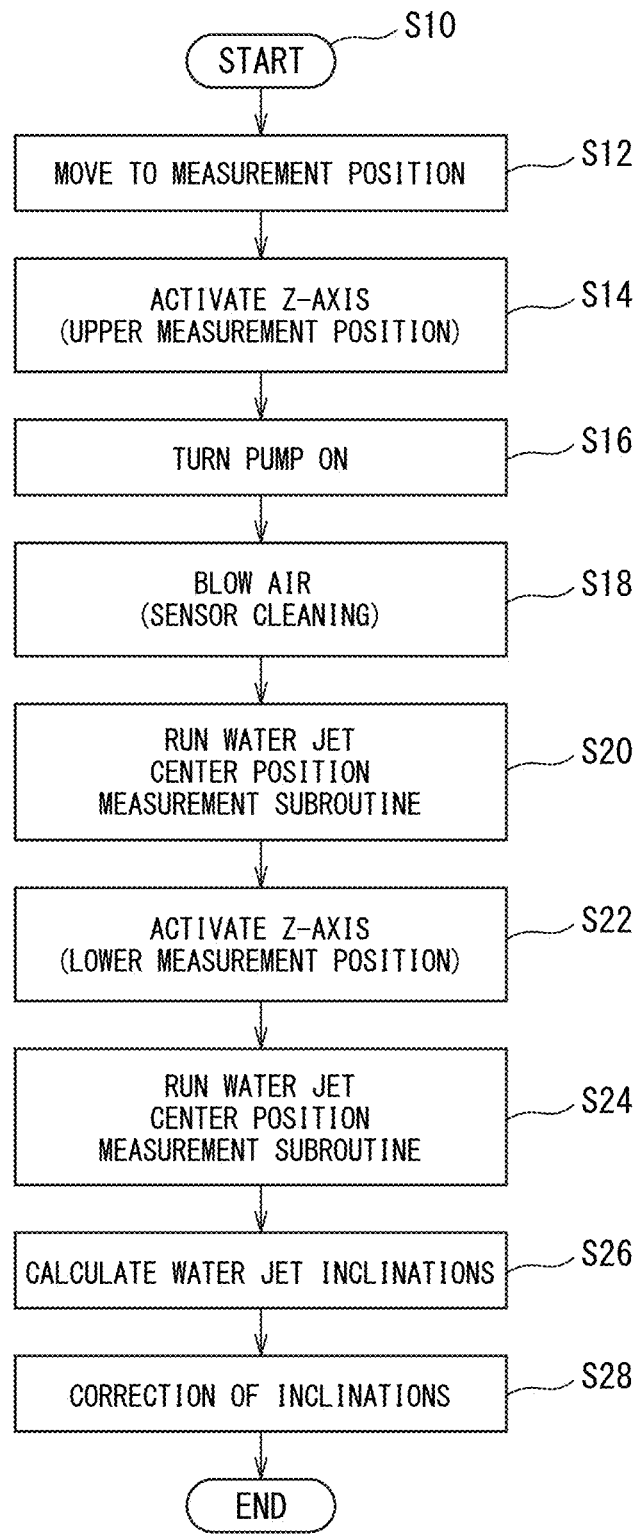
FIG. 4 is a flowchart showing the main routine of the method for measuring the inclination of a water jet of the present invention.
Figure 6:
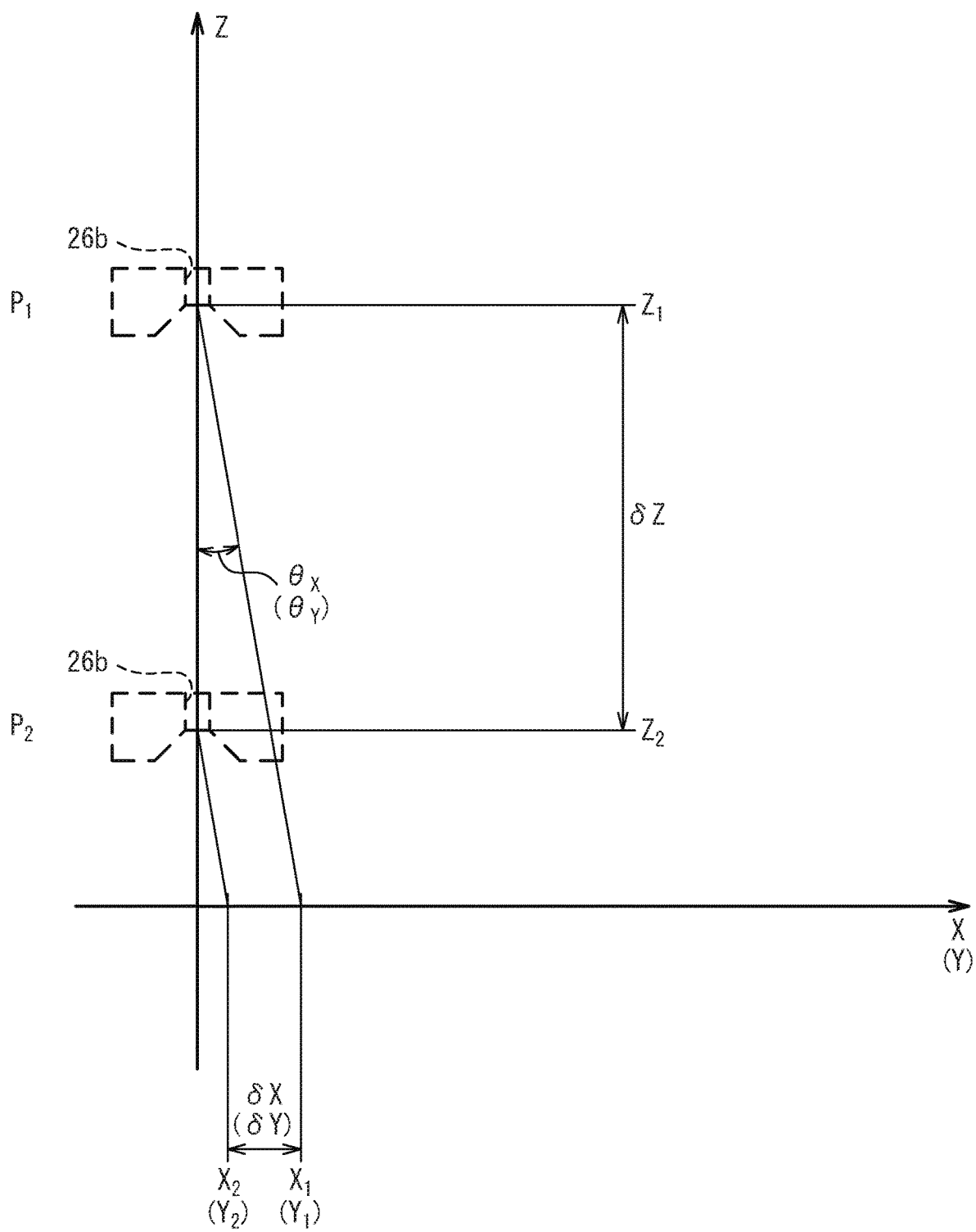
FIG. 6 is a schematic diagram for detailing the method for measuring the inclination of a water jet of the present invention.

Referring to FIG. 4, when inclination measurement of the water jet 34 begins (Step S10), the table 36 is moved in the horizontal direction with respect to the optical head 10 by the X- and Y-axis feed devices and the measuring device 100 is moved to a predetermined measurement position below the optical head 10 (Step S12). Next, the optical head 10 is moved to the first measurement position (upper measurement position) P1 ($Z=Z_1$) (FIG. 6) on the Z-axis selected within the stable-length range of the water jet 34 by the Z-axis feed device (Step S14).

Next, the pump of the ultra-pure water supply device 30 is activated, and the water jet 34 is jetted from the nozzle 26b (Step S16). Next, measurement of the center position of the water jet, which will be described later, begins (Step S20). Before the measurement of the center position of the water jet begins, it is preferable that air be blown from an air nozzle (not shown) disposed in the optical head 10 to clean the surfaces of the sensors 104a, 104b, 106a, and 106b (Step S18).

Figure 5:
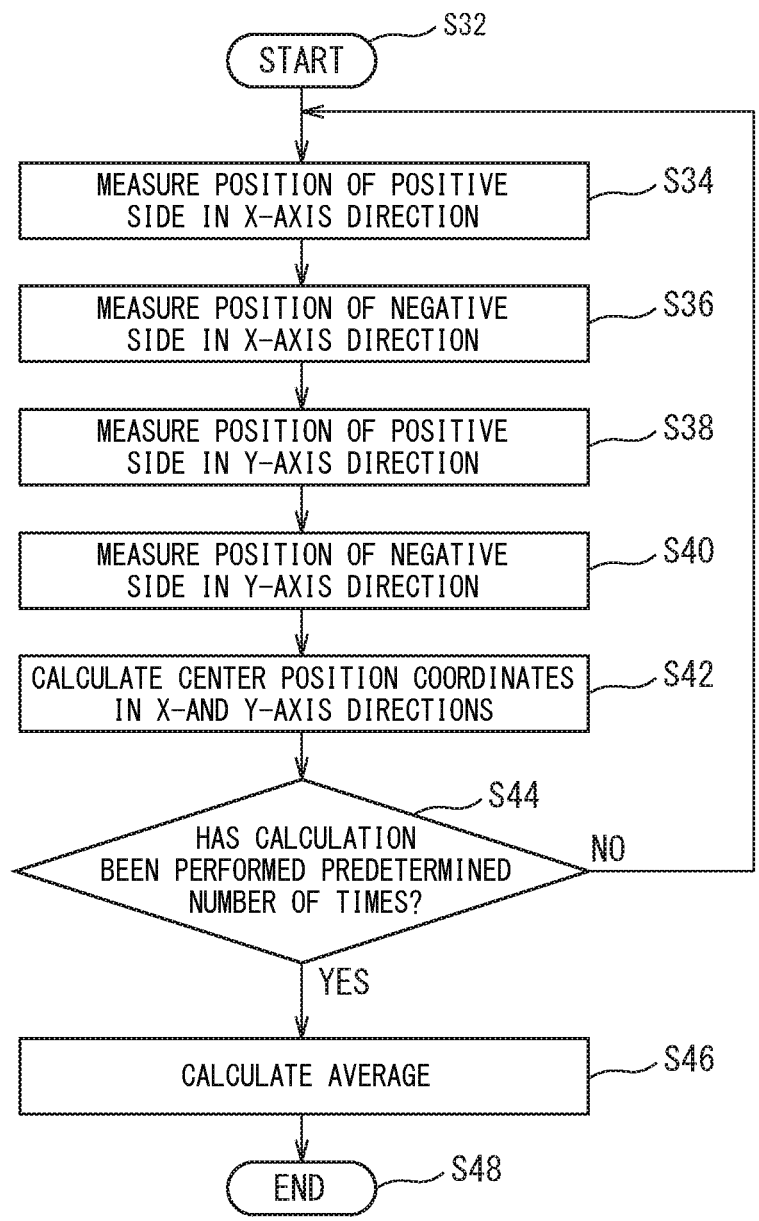
FIG. 5 is a flowchart showing a water jet central position measurement subroutine of the method for measuring the inclination of a water jet of the present invention.
Figure 7:
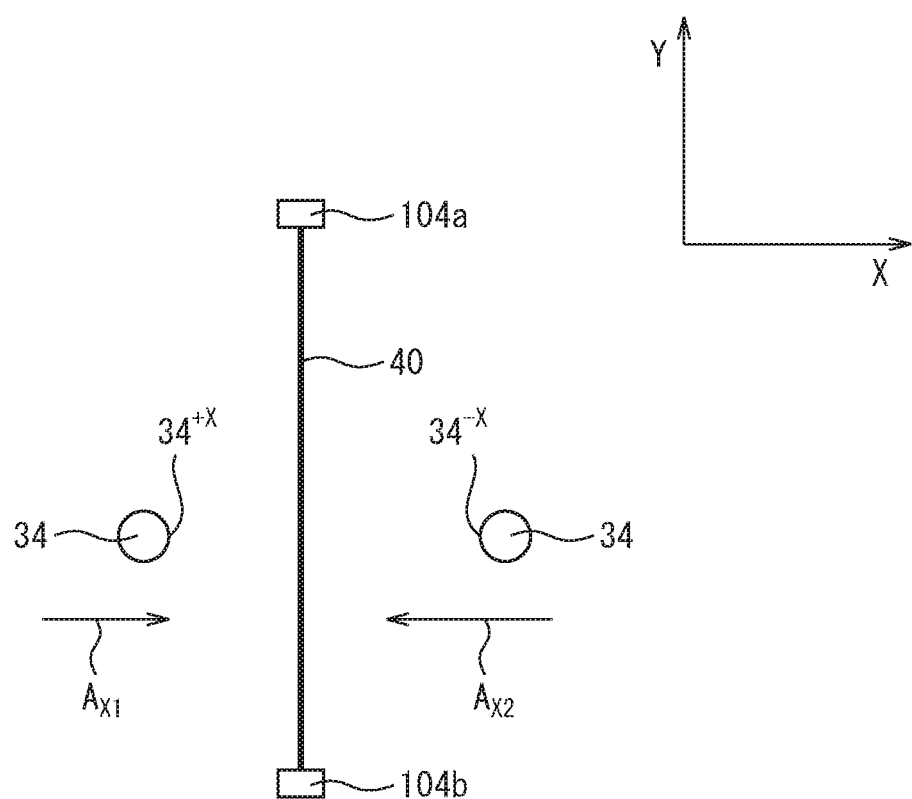
FIG. 7 is a schematic diagram for detailing the method for measuring the X coordinate of the center position of a water jet in the method for measuring the inclination of a water jet of the present invention.

In step S20, when the water jet center position measurement subroutine (FIG. 5) is called and the measurement of the center position of the water jet is started (Step S32), first, the lateral side position of the laser light on the positive side in the X-axis direction is measured by a process which is described later (Step S34). The X-axis feed device moves the table 36 in the negative direction along the X-axis. At this time, the water jet 34 jetted from the nozzle 26b moves relatively in the positive direction along the X-axis with respect to the laser light 40 formed by the first laser sensors 104a, 104b as indicated by arrow $A_{X1}$ in FIG. 7. When the positive side surface $34^{+X}$ of the water jet 34 in the X-axis direction intercepts the laser light 40, a skip signal is sent from the amplifier of the first laser sensors 104a, 104b to the control device of the laser machining device. At the time of receiving the skip signal, the controller of the laser machining device reads and stores the X coordinate from the X-axis linear scale of the laser machining device or the rotary encoder of the drive motor of the X-axis feed device.

After the water jet 34 has passed through the laser light 40, the position of the negative side surface $34^{-X}$ of the water jet 34 in the X-axis direction is measured by a process which is described later (Step S36). The table 36 is moved in the positive direction along the X-axis by the X-axis feed device and the water jet 34 is relatively moved in the negative direction along the X-axis with respect to the laser light 40, as indicated by arrow $A_{X2}$. When the negative side surface $34^{-X}$ of the water jet 34 in the X-axis direction blocks the laser light 40, a skip signal is sent from the amplifier of the first laser sensors 104a, 104b to the control device of the laser machining device. The controller of the laser machining device stores the X coordinate at the time of receiving the skip signal.

Figure 8:
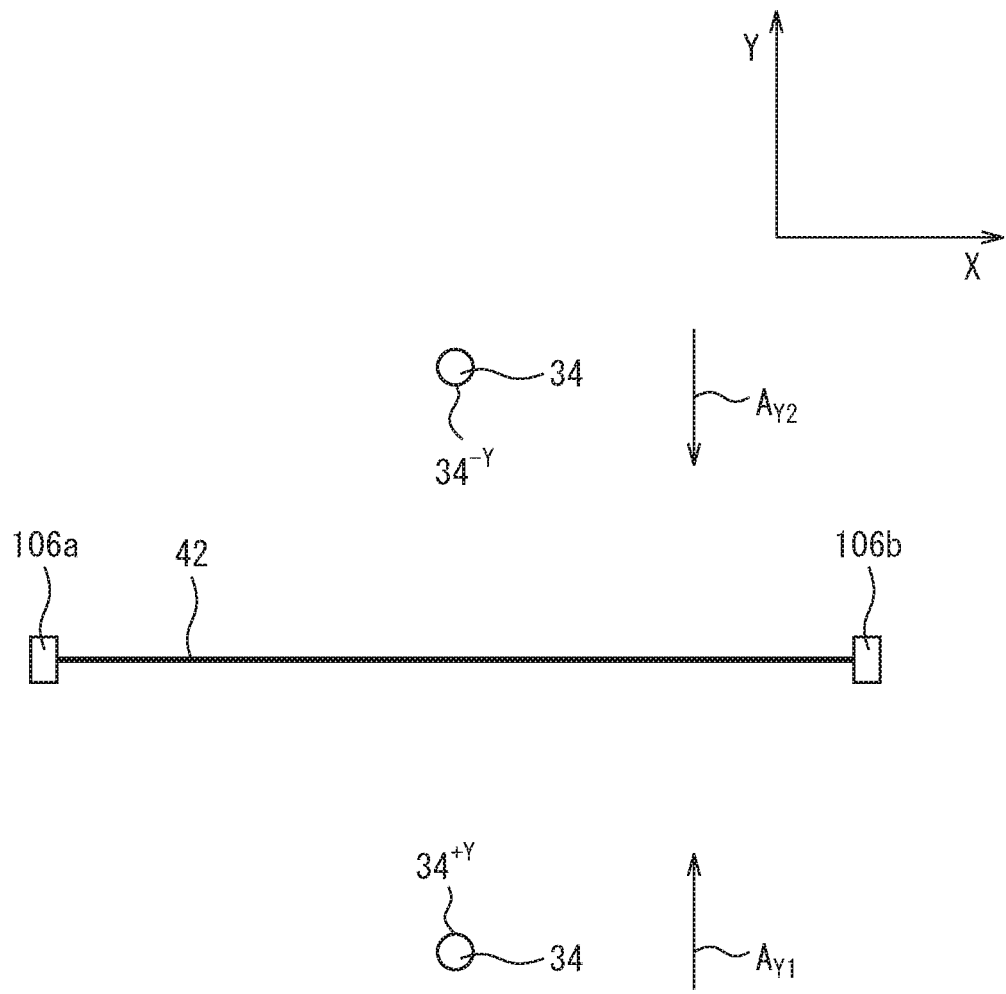
FIG. 8 is a schematic diagram for detailing the method for measuring the Y coordinate of the center position of a water jet in the method for measuring the inclination of a water jet of the present invention.

Next, similarly to the case of the X coordinates, the Y coordinates of the positive side surface $34^{+Y}$ and the negative side surface $34^{-Y}$ of the water jet 34 in the Y-axis direction are measured by moving the water jet 34 relative to the laser light 42 as indicated by arrows $A_{Y1}$ and $A_{Y2}$, as shown in FIG. 8 (Step S38 and step S40).

The center coordinates of the water jet 34 are calculated by calculating the average of the measured X coordinates of the positive side and negative side surfaces $34^{+X}$, $34^{-X}$ of the water jet 34 in the X-axis direction and the average of the Y coordinates of the positive side and negative side surfaces $34^{+Y}$, $34^{-Y}$ in the Y-axis direction (Step S42). The calculated center coordinates are stored in the controller of the laser machining device. The central coordinates of the water jet 34 are calculated a predetermined number of times by repeating steps S34 to S42 a predetermined number of times (Step S44). When the average value of the center coordinates of the water jet 34, which has been calculated a predetermined number of times (Step S46), is calculated, the center coordinates $(X_1, Y_1)$ of the water jet 34 are set as the first measurement position $P_1$, and the subroutine ends (Step S48).

When the center position measurement subroutine of water jet ends and returns to the main routine of FIG. 4, the optical head 10 next moves downward in the Z-axis direction and moves to the second measurement position (lower measurement position) $P_2$ ($Z=Z_2$) (FIG. 6) selected within the stable-length range of the water jet 34 (Step S22). When the optical head 10 moves to the second measurement position $P_2$, the water jet center position measurement subroutine of FIG. 5 is called again (Step S24), the center coordinates $(X_2, Y_2)$ of the water jet 34 at the second measurement position $P_2$ are measured in steps S32 to S48, and the process returns to the main routine.

After the center coordinates $(X_1, Y_1)$ and $(X_2, Y_2)$ of the water jet 34 at the first measurement position $P_1$ and the second measurement position $P_2$ have been measured, the inclinations $\theta_X$ and $\theta_Y$ of the water jet 34 in the X-axis direction and the Y-axis direction are calculated from the following equations (Step S26).

Equation 1

$$\theta_X = \tan^{-1}\frac{\delta X}{\delta Z} \quad (1)$$

where:

$\theta_X$ is the inclination of the water jet in the X-axis direction with respect to the Z-axis;

$\delta Z$ is the distance in the Z-axis direction between the first measurement position (upper measurement position) $P_1$ and the second measurement position (lower measurement position) $P_2$ ($=Z_1-Z_2$); and $\delta X$ is the difference ($=X_1-X_2$) between the X coordinates of the center of the water jet measured at the first measurement position (upper measurement position) $P_1$ and the second measurement position (lower measurement position) $P_2$. $\delta Z$ is the distance in the Z-axis direction between the first measurement position $P_1$ and the second measurement position $P_2$, and is preferably a distance (2 to 5 mm) slightly shorter than the stable-length described in Table 1.

Equation 2

$$\theta_Y = \tan^{-1}\frac{\delta Y}{\delta Z} \quad (2)$$

where:

$\theta_Y$ is the inclination of the water jet in the Y-axis direction with respect to the Z-axis; and $\delta Y$ is the difference ($=Y_1-Y_2$) between the Y coordinates of the center of the water jet measured at the first measurement position (upper measurement position) $P_1$ and the second measurement position (lower measurement position) $P_2$;

According to the present embodiment, it is possible to correct the inclination of the water jet 34 with respect to the Z-axis by adjusting the rotation feed axes of the A-axis and B-axis, based on the inclination $\theta_X$ of the water jet 34 in the X-axis direction and the inclination $\theta_Y$ of the water jet 34 in the Y-axis direction with respect to the Z-axis (Step S28). As a result, it is possible to irradiate the laser light generated by the optical head 10 perpendicularly to the surface of the workpiece W. Furthermore, it is possible to correct the feed amount of the table 36 in the X- and Y-axis directions based on the inclination $\theta_X$ of the water jet 34 in the X-axis direction and the inclination $\theta_Y$ of the water jet 34 in the Y-axis direction with respect to the Z-axis. The operation starting with this measurement through correction can be performed automatically. The nozzle 26b is replaced when it is necessary to change the diameter of the water jet in accordance with the machining shape. Measurement may be performed after this replacement, or measurement may be performed just before precision machining is performed.

In the present embodiment, a case in which the table side includes the B-axis and C-axis has been described. Instead of this configuration, a case in which there is no rotating feed device on the table side and the A'-axis and the B'-axis are on the optical head 10 side is virtually shown in FIG. 1. Namely, it can be considered that the optical head 10 can be rotationally fed around the axis parallel to the X-axis in the A'-axis direction and can be rotationally fed around the axis parallel to the Y-axis in the B'-axis direction. In this configuration, by rotating the A'-axis and the B'-axis so as to eliminate the inclinations $\theta_X$ and $\theta_Y$ of the water jet 34 calculated in step S26, it is possible to correct the water jet 34 so as to be parallel to the Z-axis. In the case of this configuration, machining can be performed to a desired accuracy by transmitting the X-, Y- and Z-axis feed amounts commanded by the NC program without adjusting them.

Furthermore, though not shown, even if the nozzle 26b is rotationally adjustably attached to the nozzle head 26, inclination correction is possible, and inclination correction is possible even if workpiece W is attached to table 36 by a jig capable of rotation adjustment.

REFERENCE SIGNS LIST

10 Optical Head
12 Housing
14 Laser Oscillator
16 Laser Irradiation Head
18 Collimation Lens
20 First Mirror
22 Second Mirror
24 Focus Lens
26 Nozzle Head
26b Nozzle
28 Duct
30 Ultra-Pure Water Supply Device
34 Water Jet
36 Table
38 Rotary Table
40 Laser Light
100 Inclination Measuring Device

The invention claimed is:

1. A method for measuring inclination of a water jet of a laser machining device which machines a workpiece by relatively moving laser light which has been introduced and guided into the interior of a water jet jetted from an optical head through a nozzle and a workpiece which is fixed to a table, the method comprising:

obtaining a stable-length of the water jet in which the laser light passing through the interior of the water jet can be reflected and advance in an axial direction based on a diameter of the nozzle and a pressure of the water supplied to the nozzle;

arranging the optical head at a first height position along a vertical first feed axis within the range of the obtained stable-length;

jetting the water jet from the optical head in a substantially vertically downward direction;

measuring a center position of the water jet in a horizontal plane;

arranging the optical head at a second height position along the first feed axis within the range of the obtained stable-length, wherein the distance between the first and second height positions is variably set to a value slightly shorter than the stable-length depending on the nozzle diameter and the water pressure;

jetting the water jet from the optical head in a substantially vertically downward direction;

measuring the center position of the water jet in a second horizontal plane; and measuring the inclination of the water jet with respect to the first feed axis the difference between the center position of the water jet at the first height position and the center position of the water jet at the second height position, and the length along the first feed axis at the first and second height positions, wherein the stable-length is obtained by referring to a table or a graph showing stable-lengths of the water jet in association with the different diameters of the nozzle and the different pressures of the water supplied to the nozzle.

2. The method for measuring inclination of a water jet of a laser machining device of claim 1, comprising:

arranging a measuring device on the table;

for measuring a center position of the water jet along a horizontal second linear feed axis with the measuring device, relatively moving the table and the optical head in one direction along the second linear feed axis to detect a first position of the water jet at one peripheral side of the water jet along the second linear feed axis;

for measuring the center position of the water jet along the second linear feed axis with the measuring device, relatively moving the table and the optical head in a direction opposite to the one direction along the second linear feed axis to detect a second position of the water jet at the other peripheral side of the water jet along the second linear feed axis;

averaging the first and second positions of the water jet, and setting the average as the center position of the water jet along the second linear feed axis;

for measuring a center position of the water jet along a horizontal third linear feed axis with the measuring device, relatively moving the table and the optical head in one direction along the third linear feed axis, which is perpendicular to the second linear feed axis to detect a third position of the water jet at one peripheral side of the water jet along the third linear feed axis;

for measuring the center position of the water jet along the third linear feed axis with the measuring device, relatively moving the table and the optical head in a direction opposite to the one direction along the third linear feed axis to detect a fourth position of the water jet at the other peripheral side of the water jet along the third linear feed axis; and averaging the third and fourth positions of the water jet, and setting the average as the center position of the water jet along the third linear feed axis.

3. The method for measuring inclination of a water jet of a laser machining device of claim 2, wherein the measuring device includes a laser-type sensor that emits and receives laser light in two horizontal directions perpendicular to the second and third linear feed axes.

* * * * *